(12) United States Patent
Colwell

(10) Patent No.: US 7,237,507 B1
(45) Date of Patent: Jul. 3, 2007

(54) SELECTIVE BIRD FEEDER

(75) Inventor: Betsy P. Colwell, Foster, RI (US)

(73) Assignee: Droll Yankees, Inc., Foster, RI (US)

( * ) Notice: Subject to any disclaimer, the term of this patent is extended or adjusted under 35 U.S.C. 154(b) by 142 days.

(21) Appl. No.: 09/816,016

(22) Filed: Mar. 23, 2001

Related U.S. Application Data

(60) Provisional application No. 60/191,611, filed on Mar. 23, 2000.

(51) Int. Cl.
*A01K 1/00* (2006.01)
*A01K 61/02* (2006.01)

(52) U.S. Cl. .................. 119/51.01; 119/52.2; 119/52.3; 119/57.8; 119/57.9

(58) Field of Classification Search ............... 119/52.2, 119/52.3, 57.8, 57.9, 51.01; D30/124, 125, D30/127, 128
See application file for complete search history.

(56) References Cited

U.S. PATENT DOCUMENTS

| | | | | |
|---|---|---|---|---|
| 2,524,502 A | | 10/1950 | Wilkinson | |
| 3,301,217 A | * | 1/1967 | Prowinsky | 119/57.9 |
| 3,316,883 A | | 5/1967 | Johnson | |
| 3,399,650 A | | 9/1968 | Goodman | |
| 3,568,641 A | * | 3/1971 | Kilham | 119/57.8 |
| 4,030,451 A | * | 6/1977 | Miller | 119/57.9 |
| 4,327,669 A | * | 5/1982 | Blasbalg | 119/57.8 |
| 4,355,597 A | * | 10/1982 | Blasbalg | 119/57.8 |
| 4,434,745 A | | 3/1984 | Perkins et al. | |
| 5,016,573 A | | 5/1991 | Power | |
| 5,111,772 A | | 5/1992 | Lipton | |
| 5,207,180 A | | 5/1993 | Graham | |
| 5,323,735 A | | 6/1994 | Meng | |
| 5,377,617 A | | 1/1995 | Harwich | |
| 5,452,682 A | * | 9/1995 | Bescherer et al. | 119/57.8 |
| 5,558,040 A | * | 9/1996 | Colwell et al. | 119/52.2 |
| 5,791,286 A | * | 8/1998 | Taussig et al. | 119/52.3 |
| 5,823,541 A | * | 10/1998 | Dietle et al. | 277/320 |
| 6,539,892 B1 | * | 4/2003 | Bescherer | 119/52.1 |

OTHER PUBLICATIONS

Duncraft, Winter & Holidays 1999 "specialties for Enjoying Wild Birds" Penacook, NH, pp. 1-48 (items 180M, 183M, 181M, 188M, 161M).*
Droll Yankees, "Extending the Sanctuary Series . . . ,".
ASPECTS Brochure "Songbird Select".
Duncraft, Winter & Holidays 1999 "Specialties for Enjoying Wild Birds," Penacook, NH, pp. 1-48.
Droll Yankees, "Droll Yankees Bird Feeders," Foster, RI, pp. 1-19.

* cited by examiner

*Primary Examiner*—Andrea M. Valenti
(74) *Attorney, Agent, or Firm*—Salter & Michaelson

(57) ABSTRACT

A selective bird feeder is provided. The selective bird feeder includes a selective housing having a side wall and a base. A cover supported by the side wall of the selected housing and a seed holder is contained within the selective housing. The selective housing restricts access of relatively large birds and predators, while allowing access of smaller birds, such as song birds, to the interior space in which the seed holder is disposed.

12 Claims, 21 Drawing Sheets

SELECTIVE BIRD FEEDER

RELATED CASES

Priority under 35 U.S.C. §119(e) is hereby claimed to U.S. Provisional Application No. 60/191,611 to Colwell, filed on Mar. 23, 2000.

BACKGROUND

1. Technical Field

The present invention is directed to a selective feeder and, in particular, to a selective bird feeder.

2. Related Art

A variety of selective feeders are known for selectively allowing entrance of animals of a selected size while restricting the entrance of animals that are larger than the selected size.

With respect to bird feeders, in particular, house finches and squirrels tend to dominate bird feeding or drinking areas, making it difficult, if not impossible for smaller, more timid birds such as the goldfinch and black-capped chickadee to participate. Thus, many attempts have been made to provide a bird feeder that allows relatively smaller birds, which are typically songbirds, access to a bird feeder, while restricting access to such feeders by relatively larger birds. In addition, due to the resourcefulness of squirrels in their attempts to access seed contained in feeders, many attempts have also been made to provide a "squirrel proof" bird feeder.

Attempts to deal with the problems of dominant or persistent birds and squirrels have not always been successful, and in some instances have resulted in other problems. For example, such feeders are generally larger and heavier than non-selective feeders. Such feeders may also be difficult to refill with seed, as they may require complicated disassembly and reassembly. For similar reasons, such feeders may be difficult to clean. The fact that such feeders are generally larger and heavier than non-selective feeders makes refilling and cleaning more cumbersome as well.

There remains a need in the art for an improved selective bird feeder.

SUMMARY

The present invention is directed to a selective feeder, preferably a selective bird feeder. The selective feeder includes a selective housing having a sidewall and a base. A cover is supported by the sidewall of the selective housing, and a seed holder is contained within the selective housing. In some embodiments, the seed holder is supported on the base. In other embodiments, the selective housing is supported on the base. Both the seed holder and the selective housing may in some embodiments be attached to the base.

In another embodiment, the selective feeder includes a selective housing having a cylindrical sidewall and including apertures having a width ranging from about 1.3 inches to about 1.7 inches. A removable cover is supported on the cylindrical sidewall of the selective housing. A cylindrical seed holder is contained within and spaced apart from the cylindrical sidewall of the selective housing. A hanger may be hanger attached to the selective bird feeder. The removable cover may be in direct contact with the cap of the cylindrical seed holder and the sidewall of the selective housing. Alternatively, the removable cover may be in direct contact with the cylindrical seed holder and the sidewall of the selective housing while being spaced apart from the cap of the cylindrical seed holder.

In another embodiment, the selective bird feeder includes a selective housing having at least one sidewall and a base. At least one sidewall of the selective housing includes a plurality of apertures. A seed holder is at least partially contained within the selective housing and supported by the base of the selective housing. A space is disposed between a sidewall of the seed holder and the at least one sidewall of the selective housing. A removable top is in direct contact with the seed holder and supported by the at least one sidewall of the selective housing. The removable top includes an aperture through which a portion of the seed holder extends. The seed holder further includes a cap spaced apart from the removable top. The seed holder further includes a hanger attached to the cap.

In some embodiments, the cover is maintained in fixed relation to the selective housing using a suitable device positioned above the cover. The device may be a spring clip, a clamp and nut assembly, an annular rib formed in the seed housing, or other suitable equivalents known to those of skill in the art.

In some embodiments, the cover is supported by a device positioned below the cover. The device may be a spring clip, a clamp and nut assembly, or an annular rib formed in the seed housing, or other suitable equivalents known to those of skill in the art.

In some embodiments, the cover may be supported and maintained in fixed relation to the selective housing and the cap of the seed holder using suitable devices positioned above and below the cover. The devices may be spring clips, clamp and nut assemblies, or annular ribs formed in the seed housing, or other suitable equivalents known to those of skill in the art, used alone or in combination. In the present embodiment, an annular rib is generally used in conjunction with another removable device to facilitate removal of the cover.

BRIEF DESCRIPTION OF THE DRAWINGS

It should be understood that the drawings are provided for the purpose of illustration only and are not intended to define the limits of the invention. The foregoing and other features of the embodiments described herein will become apparent with reference to the following detailed description when taken in conjunction with the accompanying drawings in which.

DETAILED DESCRIPTION OF THE PREFERRED EMBODIMENTS

One embodiment of a selective feeder 10 is illustrated with reference to FIGS. 1-7A.

Figure 1:
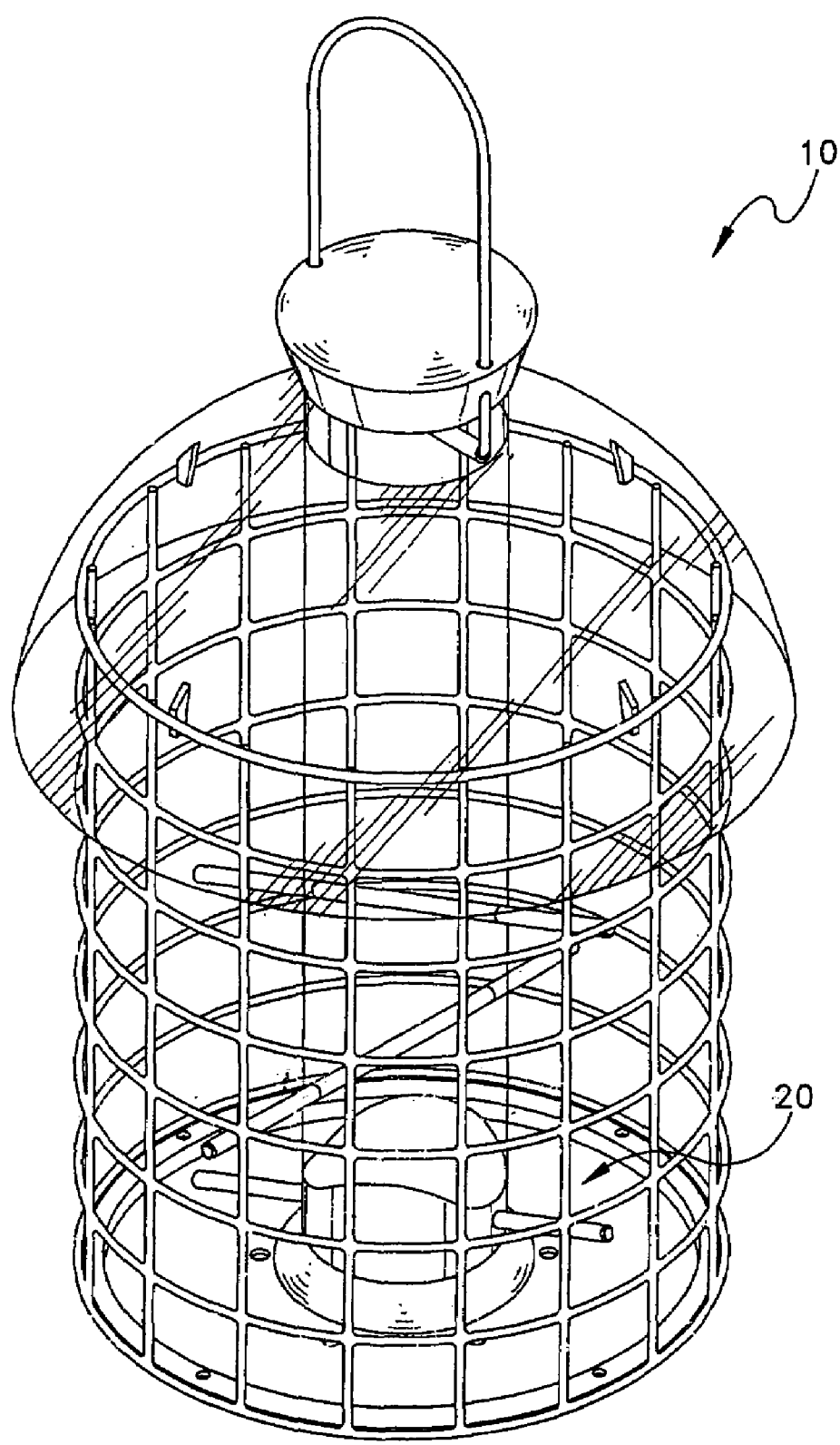
FIG. 1 is a perspective view of one embodiment of a selective bird feeder in assembled relation.
Figure 2:
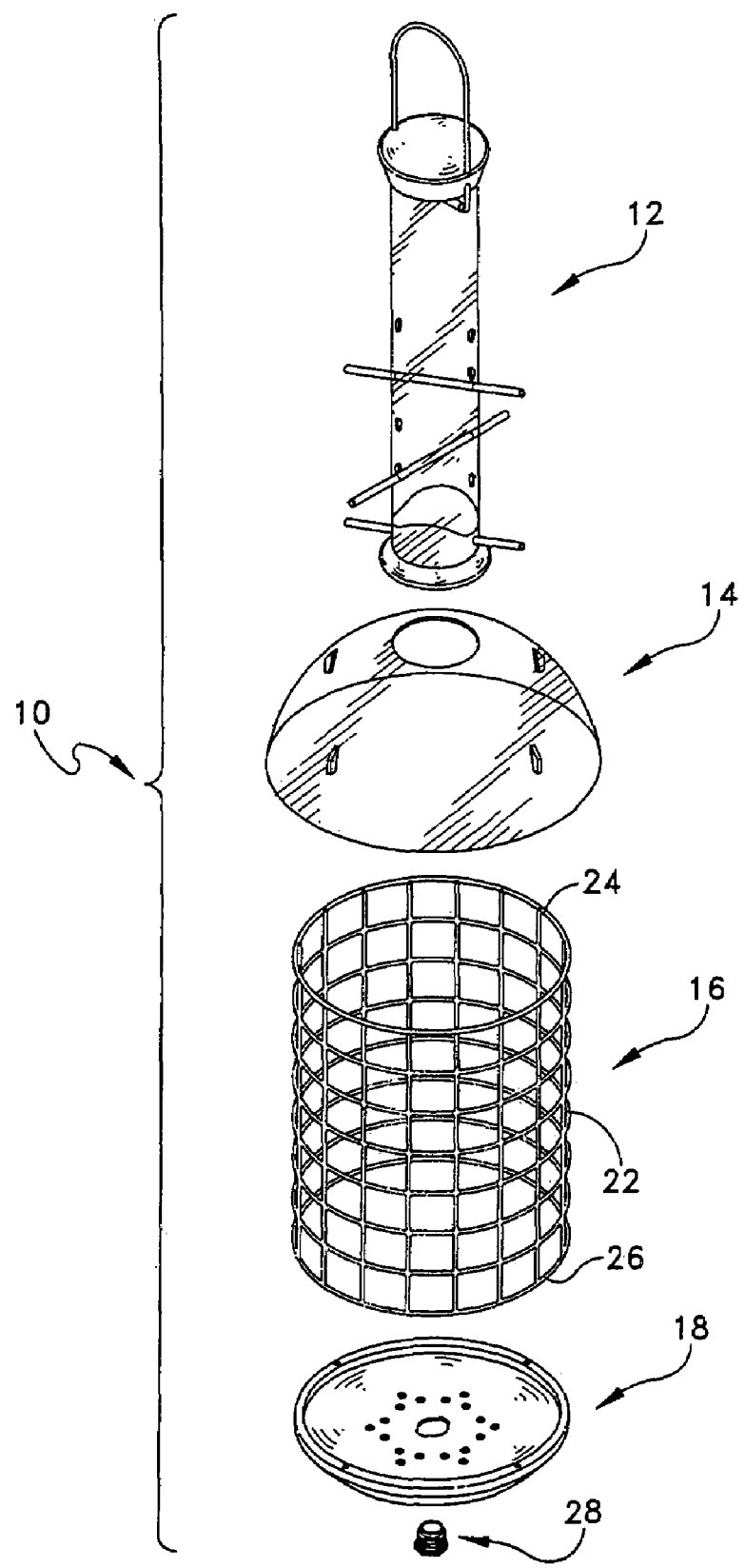
FIG. 2 is an exploded view of the selective bird feeder of FIG. 1.

Selective feeder 10 is shown in assembled relation in perspective view in FIG. 1. As shown in an exploded view in FIG. 2, selective feeder 10 includes a seed holder 12, a cover 14, a selective housing 16, and a base 18, which together define an interior space 20 (FIG. 1). Selective housing 16 includes a side wall 22 and opposing upper and lower edges 24, 26. In some embodiments, seed holder 12, selective housing 16, or both, may be fastened to base 18, which may necessitate the use of a fastening device 28. Selective housing 16 may be fastened to base 18 using, for example, wire.

Figure 3:
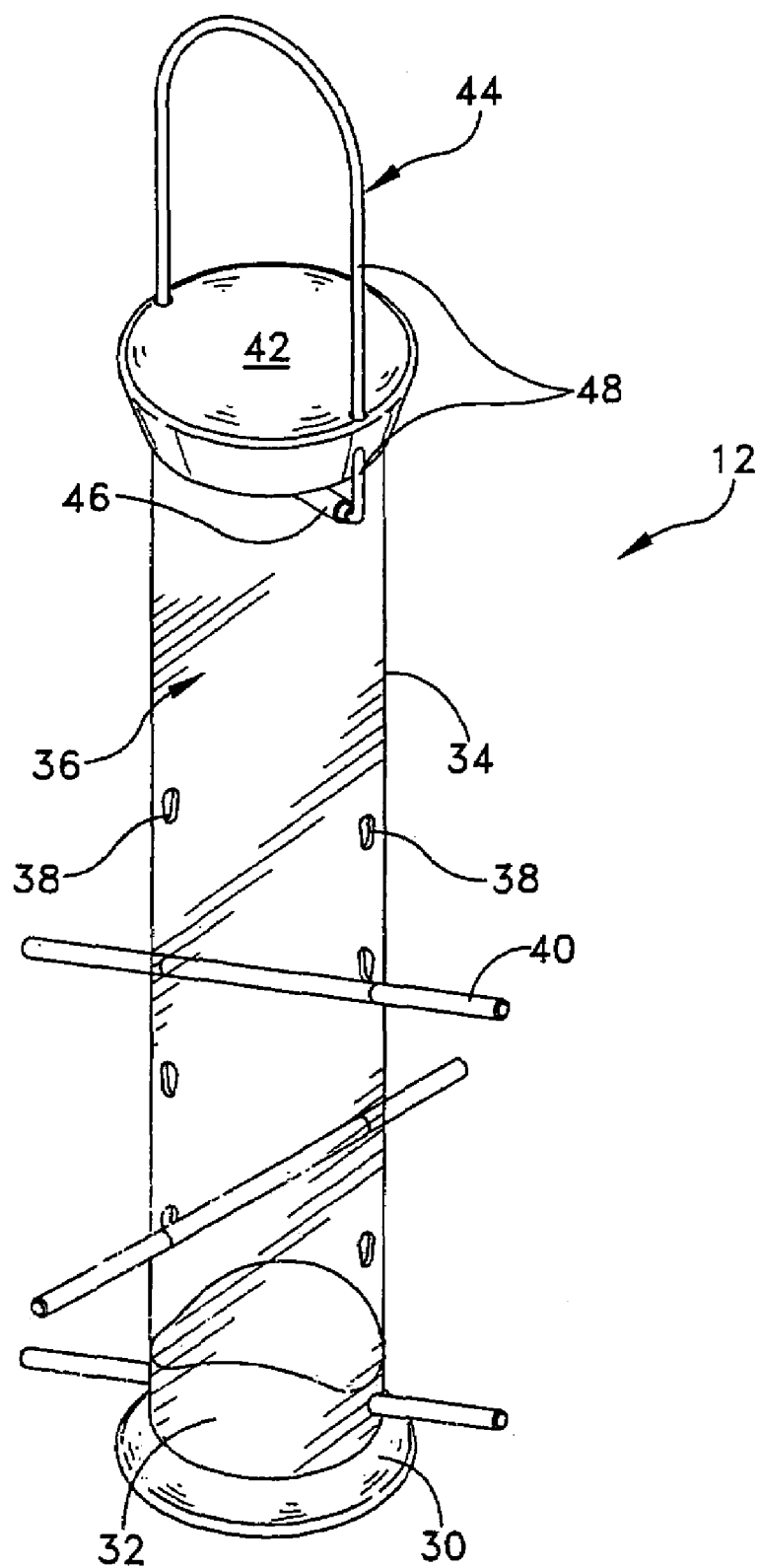
FIG. 3 is a perspective view of the seed holder of the selective bird feeder of FIG. 1.

Seed holder 12 is illustrated in greater detail in FIG. 3. Seed holder 12 includes a base 30, a seed baffle 32 and a seed housing 34 that together define a compartment 36 for containing, for example, bird seed. Seed housing 34 is illustrated herein as a substantially cylindrical tube having a length "l" and a diameter "d" that may vary as desired in order to accommodate different situations. For example, when it is desired to minimize the number of times required to refill the seed holder, the diameter, length, or both, of seed holder 12 may be increased, limited only by practical considerations such as, for example, the weight of the selective bird feeder. Seed housing 34 includes at least one aperture 38 through which selected birds may access seed that may be contained therein. Optional baffles (not illustrated) and perches 40 may be included, many types of which are well known in the art.

Base 30 and seed baffle 32 are exemplary only, and may be replaced or substituted for other configurations that are well known in the art. However, base 30 and seed baffle 32 may be separate pieces, although illustrated herein as an integral unit. Moreover, use of seed baffle 32 is not required.

In some embodiments, seed holder 12 may include a cap 42 for protecting seed contained therein from animals or the elements. Alternatively, cover 14 may be substituted for cap 42 and disposed directly on seed housing 34 to achieve the same result.

As shown, seed holder 12 may also include a hanger 44 to facilitate suspension of selective feeder 10 from a tree, a pole, or the like. Any type of hanger may be used with the selective feeder, attached to any part of the selective feeder, if desired. The present embodiment includes an exemplary hanger 44 that includes a bail rod 46 extending through seed housing 34 and a bail wire 48 connected to opposing ends of bail rod 46. The present exemplary hanger 44 is preferred because it allows ease of refilling seed housing 34, as described in greater detail below. However, any type of hanger that allows the seed holder 12 to be refilled without removing cover 14 is preferred.

As stated previously, interior space 20 is defined by seed holder 12, cover 14, selective housing 16, and base 18. Interior space 20 has a width "w" determined by the distance between seed housing 34 and selective housing 16. The only constraint on the width "w" of interior space 20 is that the entire interior space 20, or at least a portion of interior space 20, must have a width "w" sufficient to allow the selected birds to enter and move freely therein. Therefore, a selected bird may enter interior space 20 through selective housing 16 to feed from the seed holder 12. In the present embodiment, in which seed holder 12 and selective housing 16 are both illustrated as having substantially cylindrical shapes, interior space 20 has a constant width "w" extending from base 20 to the top edge 24 of selective housing 16. However, the illustrated cylindrical shapes are not required; seed holder 12 and selective housing 18 may vary in shape or size, such that at least a portion of interior space 20 has a width "w" that is sufficient to allow the selected birds to enter and move freely therein. Therefore, "w" may be any width, but in preferred embodiments, width "w" may range from about one inch to about three inches, more preferably about one and one-half inches.

Figure 4:
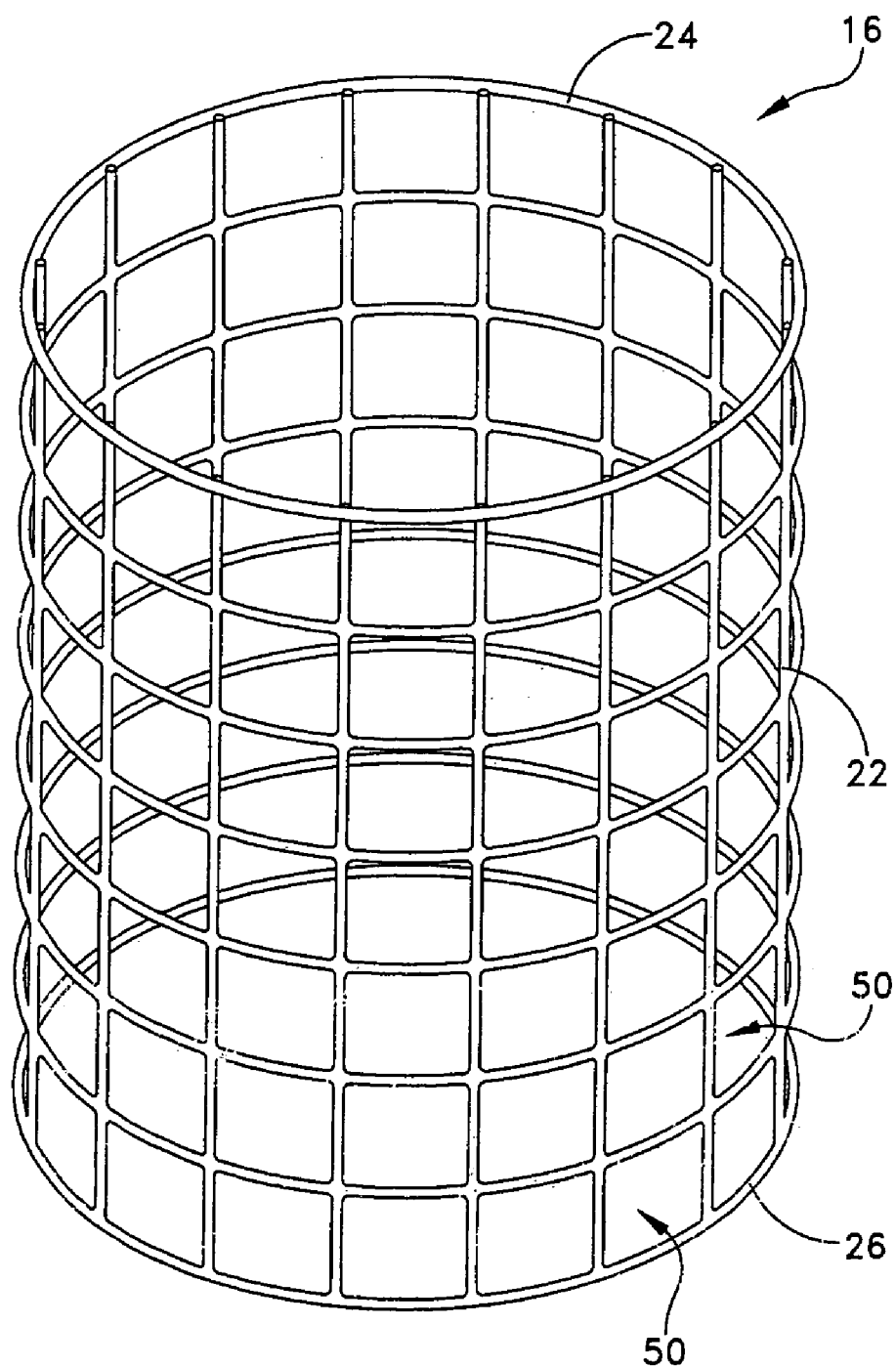
FIG. 4. is a perspective view of the selective housing of the selective bird feeder of FIG. 1.

As shown in greater detail in FIG. 4, selective housing 16 includes a least one side wall 22 and opposing upper and lower edges 24, 26. Selective housing 16 is illustrated herein as a substantially cylindrical tube having a length "l" and a diameter "d" that will vary in accordance with the length and diameter of seed housing 34 in order to maintain a sufficient width "w" of interior space 20. At least one selective aperture 50 may be disposed in sidewall 36, although many more may be included, as illustrated herein. Aperture 50 is dimensioned to allow access to interior space 20 by selected birds. In one embodiment, the selected birds are songbirds, which typically are able to pass through openings having a minimum dimension of about 1.5 inches. For example, the minimum dimension for circular apertures is the diameter of the circle; the minimum dimension of square apertures is the length of one side; the minimum dimension of rectangular apertures is the length of the shortest side, and so on. Aperture 50 of side wall 22 may have any selected dimension desired in order to provide access by birds of a selected dimension. Moreover, apertures of different shapes may be included, provided the minimum dimension is sufficiently small to restrict access by the non-selected birds.

Figure 5:
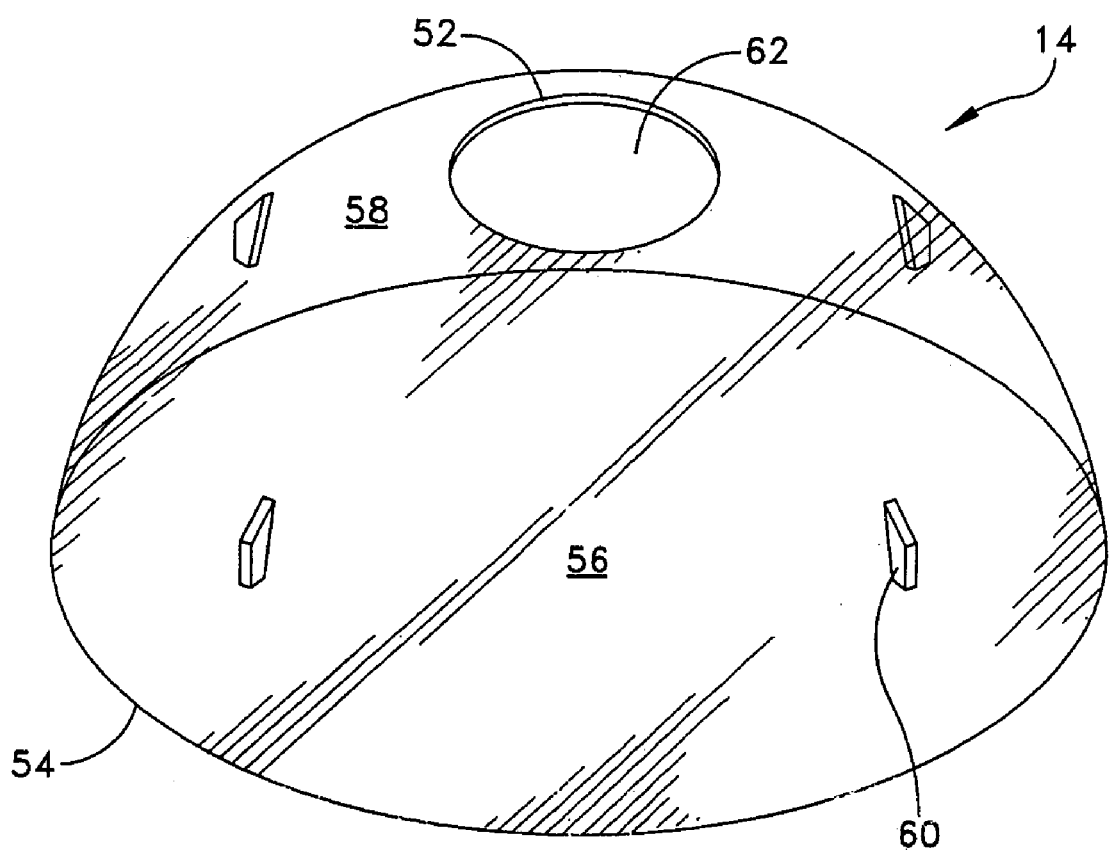
FIG. 5 is a perspective view of one embodiment of a cover for the selective bird feeder of FIG. 1.

FIG. 5 is an expanded perspective view of cover 14, which includes upper and lower edges 52,54 and interior and exterior surfaces 56,58. Interior surface 56 preferably includes a plurality of locator tabs 60 to assist with positioning cover 14 on selective housing 16. Cover 14 may be any shape or size provided that it extends beyond selective housing 16 in order to limit access by squirrels to selective housing 16. Cover 14 preferably slopes downwardly away from seed holder 12 in order to afford the greatest protection from the elements and to minimize squirrels' ability to brace or support themselves on selective feeder 10. Thus, in the present embodiment, cover 14 is illustrated as dome-shaped and having a diameter larger than the diameter "d" of selective housing 16. The amount by which the cover 14 extends beyond selective housing may be reduced or minimized as the width of interior space 20 increases.

In some embodiments, and as illustrated herein, cover 14 includes a centrally disposed aperture 62 configured to allow cover 14 to be slidably received on seed housing 34 of seed holder 12. Thus, cover 14 is spaced apart from cap 42 of seed holder 12 in the present embodiment, and a portion of seed housing 34 extends through aperture 62. In this embodiment, cover 14 is directly in contact with seed housing 34. In one embodiment, cover 14 may include apertures 30, as described above with reference to side wall 36. In yet another embodiment, cover 14 may be integrally formed with seed housing 28.

In preferred embodiments, exterior surface 58 is preferably substantially smooth and free of any surface or depression that would provide a grasping spot for squirrels and the like. Thus, providing a substantially smooth exterior surface 58 eliminates leverage that such animals might otherwise have to remove cover 14 to access seed. By providing a smooth exterior surface 58, animals are more likely to slide off than to gain leverage. In one embodiment, cover 14 may be substantially smooth and solid and formed from, for example, a transparent material such as polycarbonate. When cover 14 is substantially solid, it also provides protection from rain or dung, protecting both birds and seed contained within space 20 from becoming wet or contaminated. When cover 14 is transparent, viewers may also view birds in space 20 more easily from many different viewing angles.

Figure 5A:
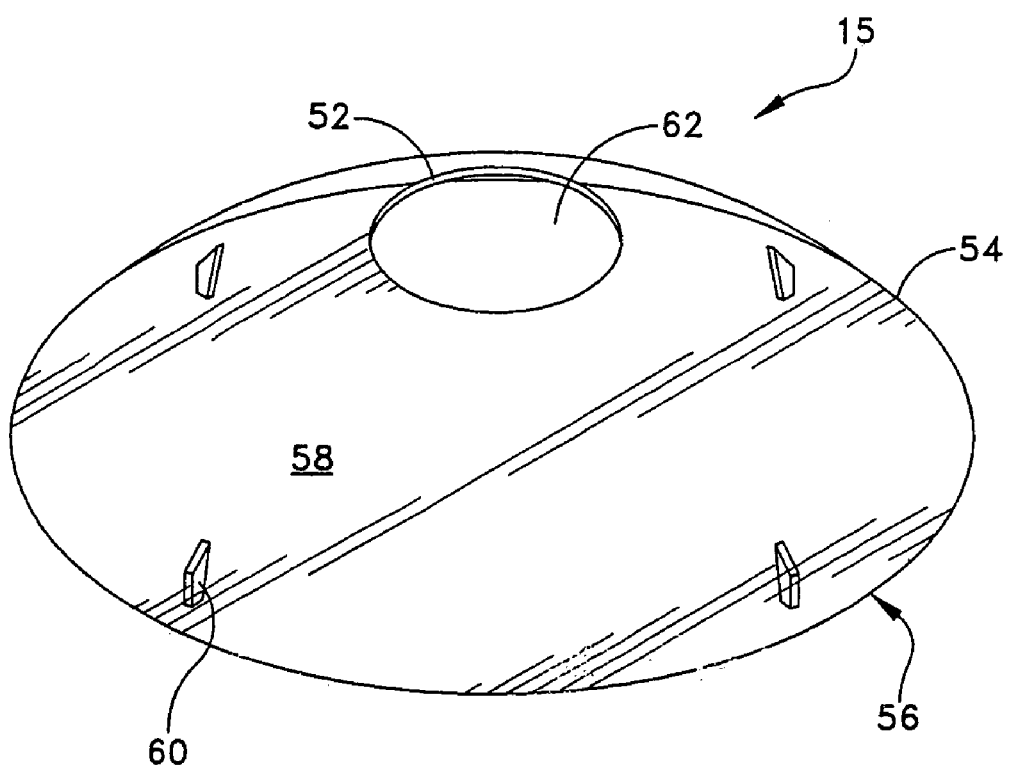
FIG. 5A is a perspective view of another embodiment of a cover for the selective bird feeder of FIG. 1.

FIG. 5A is an expanded perspective view of another embodiment of a cover 15, in which like numbers designate like elements. Cover 15 differs from cover 14 by the amount of downward slope. That is, the downward slope of cover 15 is less than that of cover 14.

Figure 5B:
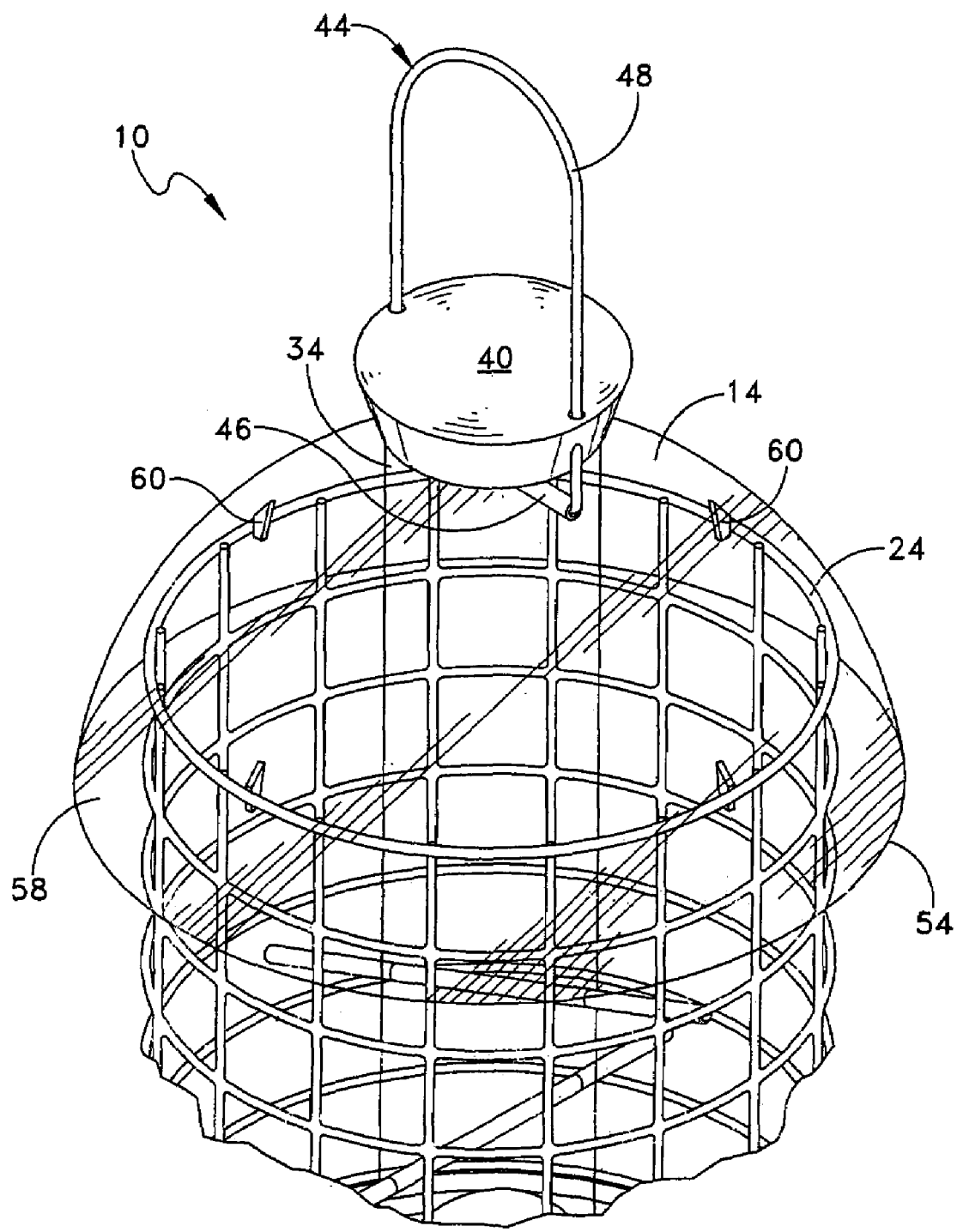
FIG. 5B is an expanded perspective view of the cover of FIG. 5 positioned on the selective housing of the feeder of FIG. 1.
Figure 5C:
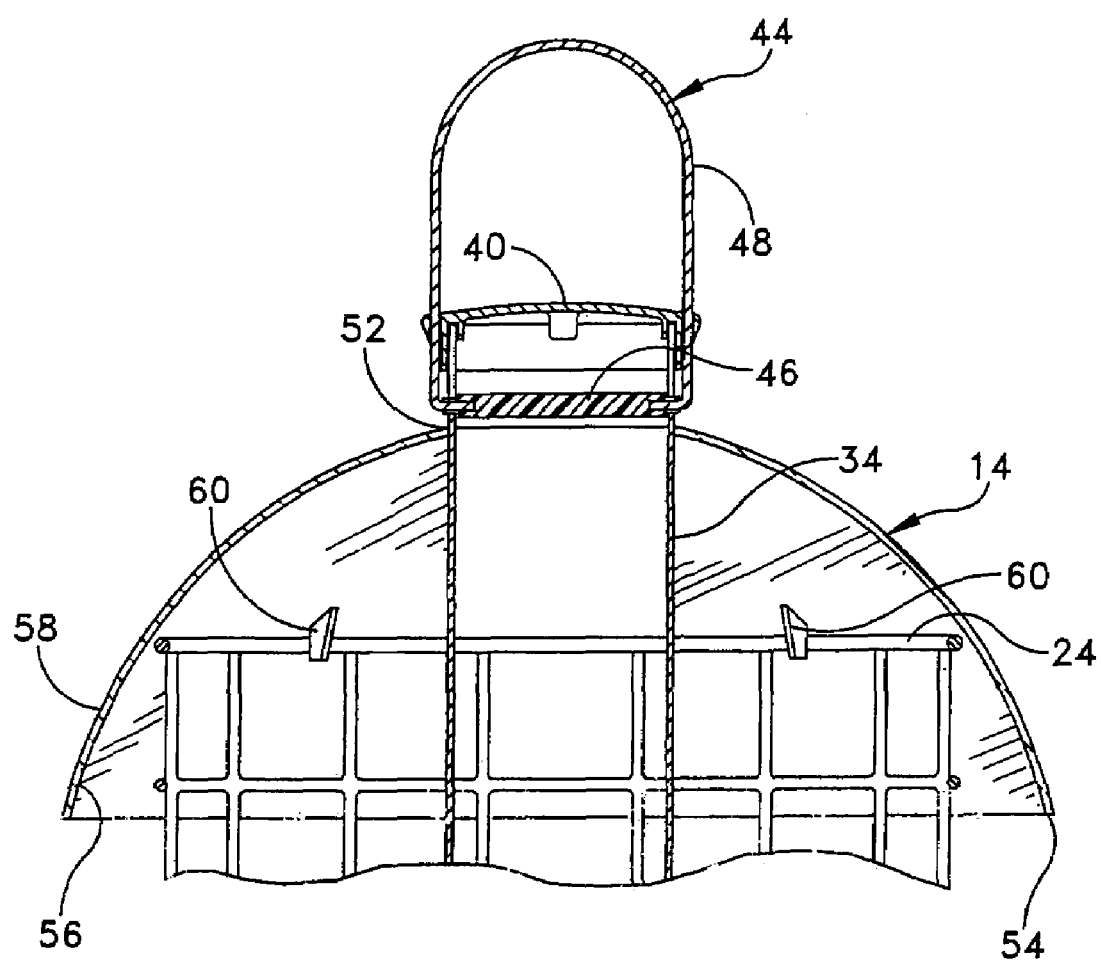
FIG. 5C is an expanded side view of the cover of FIG. 5 positioned on the selective housing of the feeder of FIG. 1.

The assembled relation of cover 14 in assembled relation with seed holder 12 and selective housing 16 is shown in expanded perspective and side view in FIGS. 5B and 5C. As shown, cover 14 is slidably received on seed housing 34 and positioned on selective housing 16 using locator tabs 60, which engage with upper edge 24 of selective housing 16. Bail rod 46 extends through seed housing 34, cap 40 is disposed over seed housing 34, and bail wire 48 is connected to bail rod 46 at opposing ends.

Figure 6A:
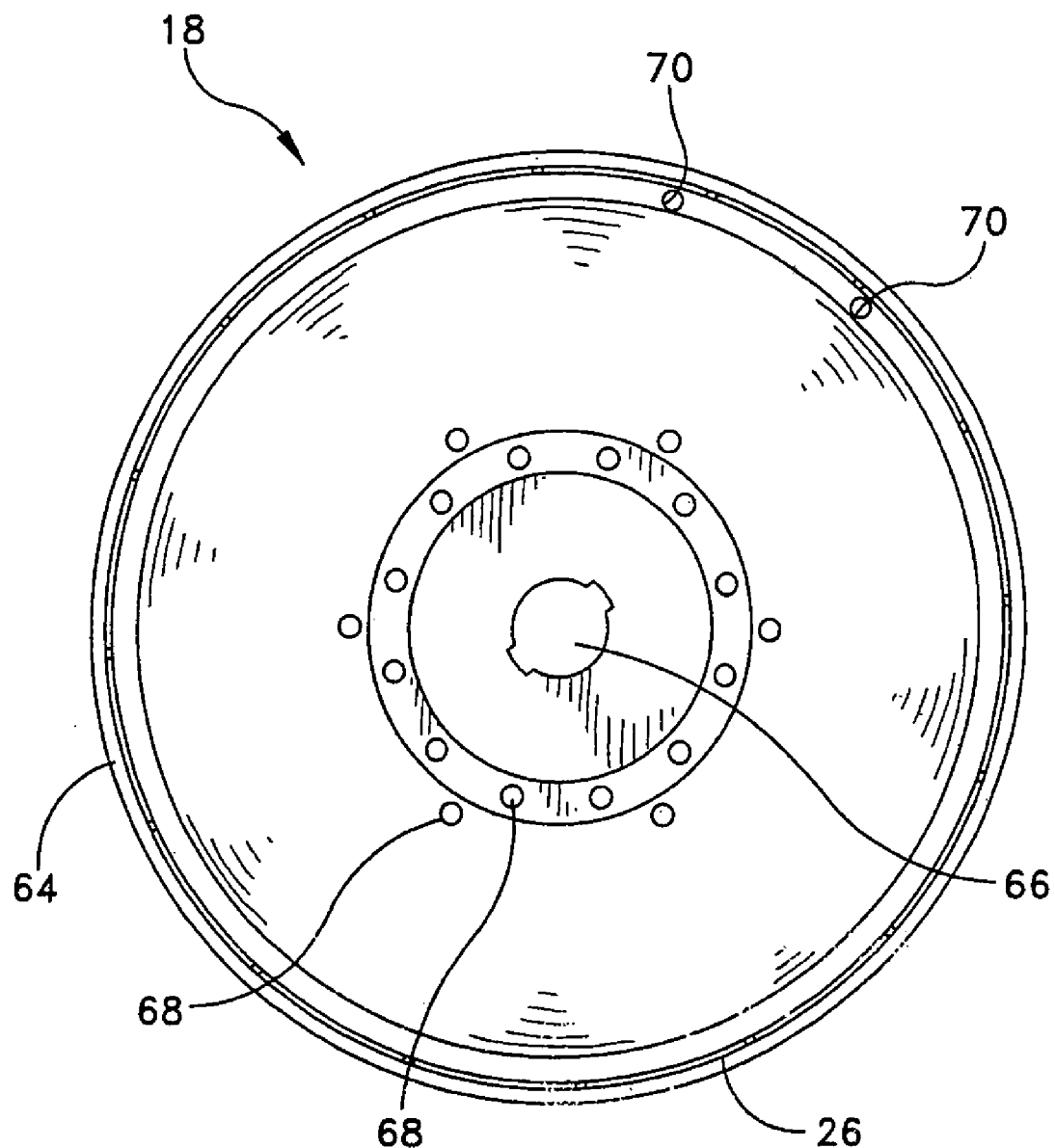
FIG. 6A is a schematic top view of the base of the selective bird feeder of FIG. 1.

FIG. 6 is an expanded top view of base 18, which preferably includes a flange 64 disposed around the perimeter of base 18 into which selective housing 16 is slidably receivable. Although not required, in some embodiments, base 18 includes a central aperture 66 through which, for example, fastener 28 may be used to attach to base 18 to base 30 of seed holder 12. However, base 30 of seed holder 12 may rest on base 18 without attachment thereto, provided that base 18 is attached to selective housing 16. If desired, drainage apertures 68 may also be provided to prevent water or other substances from collecting therein. In preferred embodiments, one or both of seed holder 12 and selective housing 16 may be attached to base 18, as described above (for example, with wire twists or wire clips). In order to facilitate such attachment, receiving apertures 70 may be disposed in base 18 as well.

Base 18 provides support for selective housing 16 and seed holder 12. As with seed holder 12 and selective housing 16, base 18 may vary in shape and size. Base 18 has a diameter "d" that will vary in accordance with the diameter of the selective housing 16 in order support selective housing 16 and to maintain a sufficient width "w" of interior space 20. Thus, in the present embodiment, base 18 is illustrated as substantially round to accommodate the cylindrical shape of selective housing 16 and seed holder 12. Base 18 preferably slopes inwardly toward seed holder 12 to prevent dropped seeds from falling to the ground.

Suitable materials for base 18 include substantially solid materials such as plastic or metal. Transparent plastics are preferred due to the ease of viewing interior space 20 that is provided from many viewing angles. One preferred plastic material is polycarbonate. It is not necessary that base 18 be solid. Thus, in one embodiment, base 18 may include apertures 50, as described above with reference to side wall 22. In yet another embodiment, base 18 may be integrally formed with side wall 22. Base 18 may also include an axially disposed boss member (not illustrated) extending upwardly on which to fix the position of seed holder 12 and to prevent seed holder 12 from moving freely around on base 18.

Figure 6B:
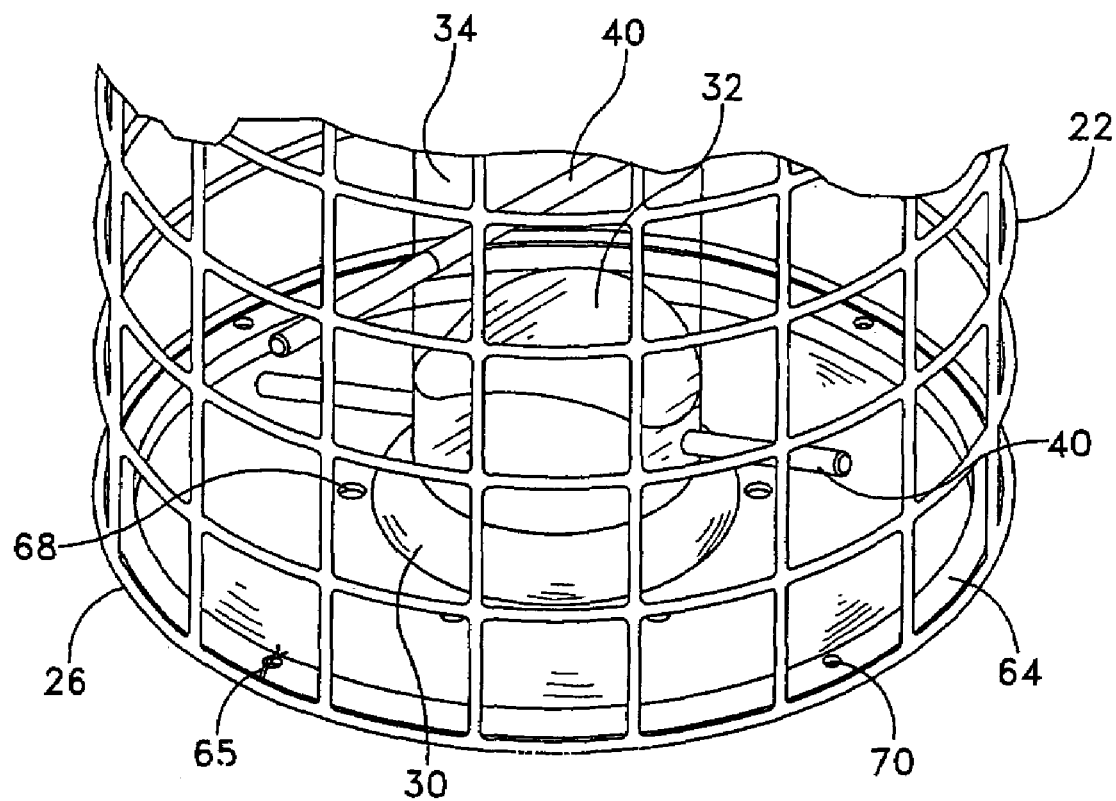
FIG. 6B is an expanded perspective view showing the selective housing and base in assembled relation.
Figure 6C:
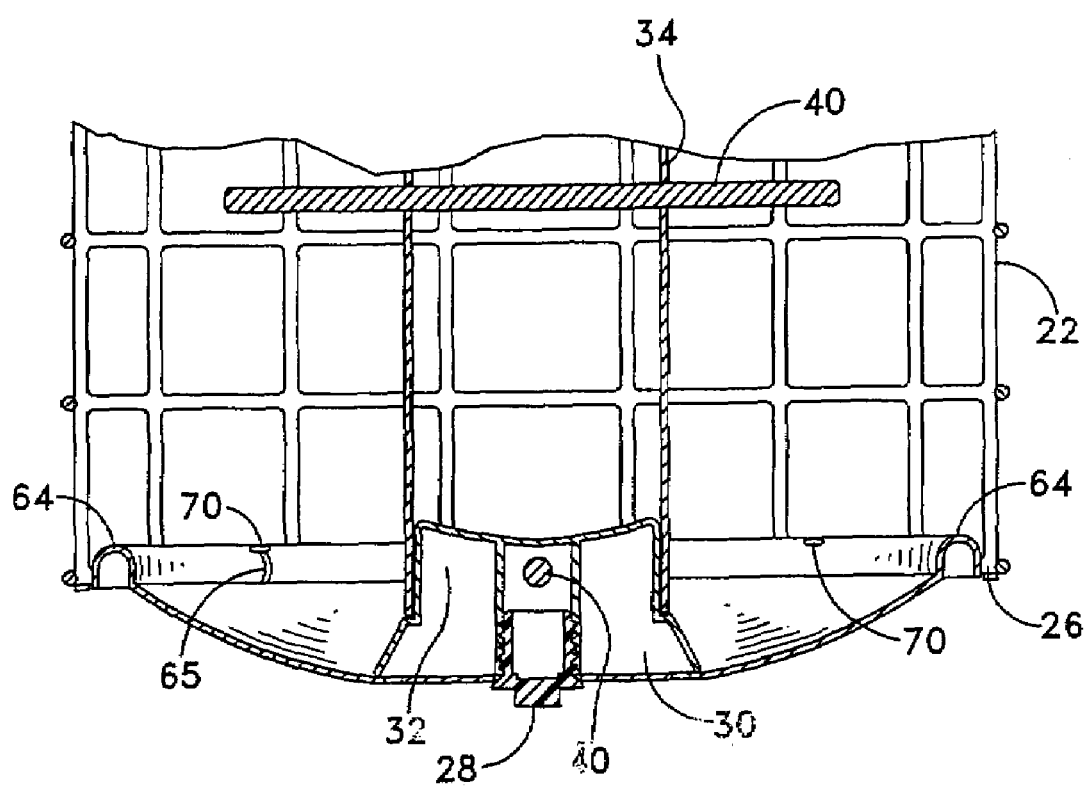
FIG. 6C is an expanded side view showing the selective housing and base in assembled relation.

The assembled relation of base 18 with seed holder 12 and selective housing 16 is shown in expanded perspective and side view in FIGS. 6B and 6C. As shown, lower edge 26 of selective housing 16 is slidably received in flange 64 of base 18. Base 30 of seed holder 12 may be centrally disposed and connected to base 18 using fastener 28. Selective housing 16 may be attached to base 18 via fasteners 65 threaded through apertures 70.

Figure 7:
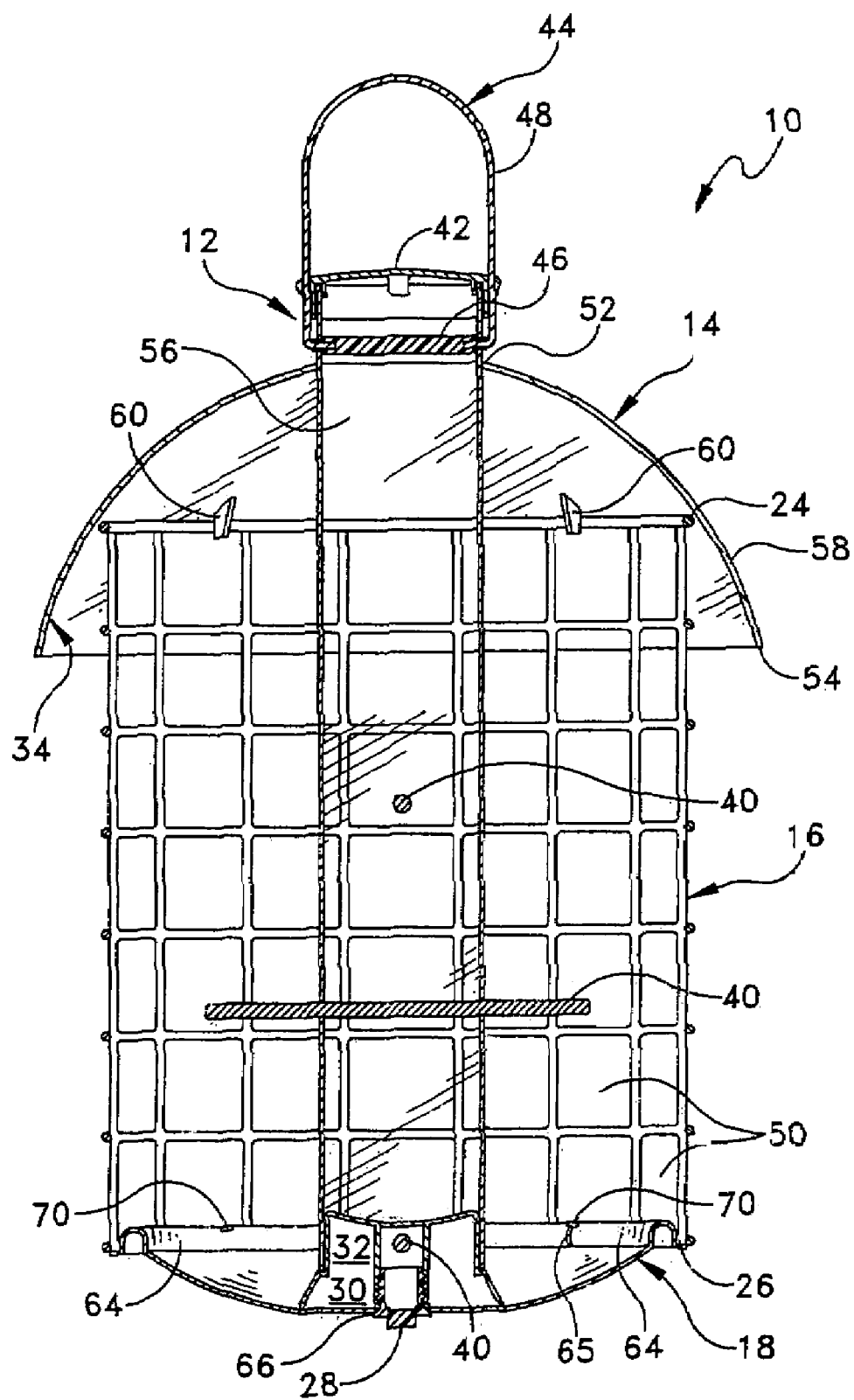
FIG. 7 is a side view of the selective bird feeder of FIG. 1 in assembled relation.
Figure 7A:
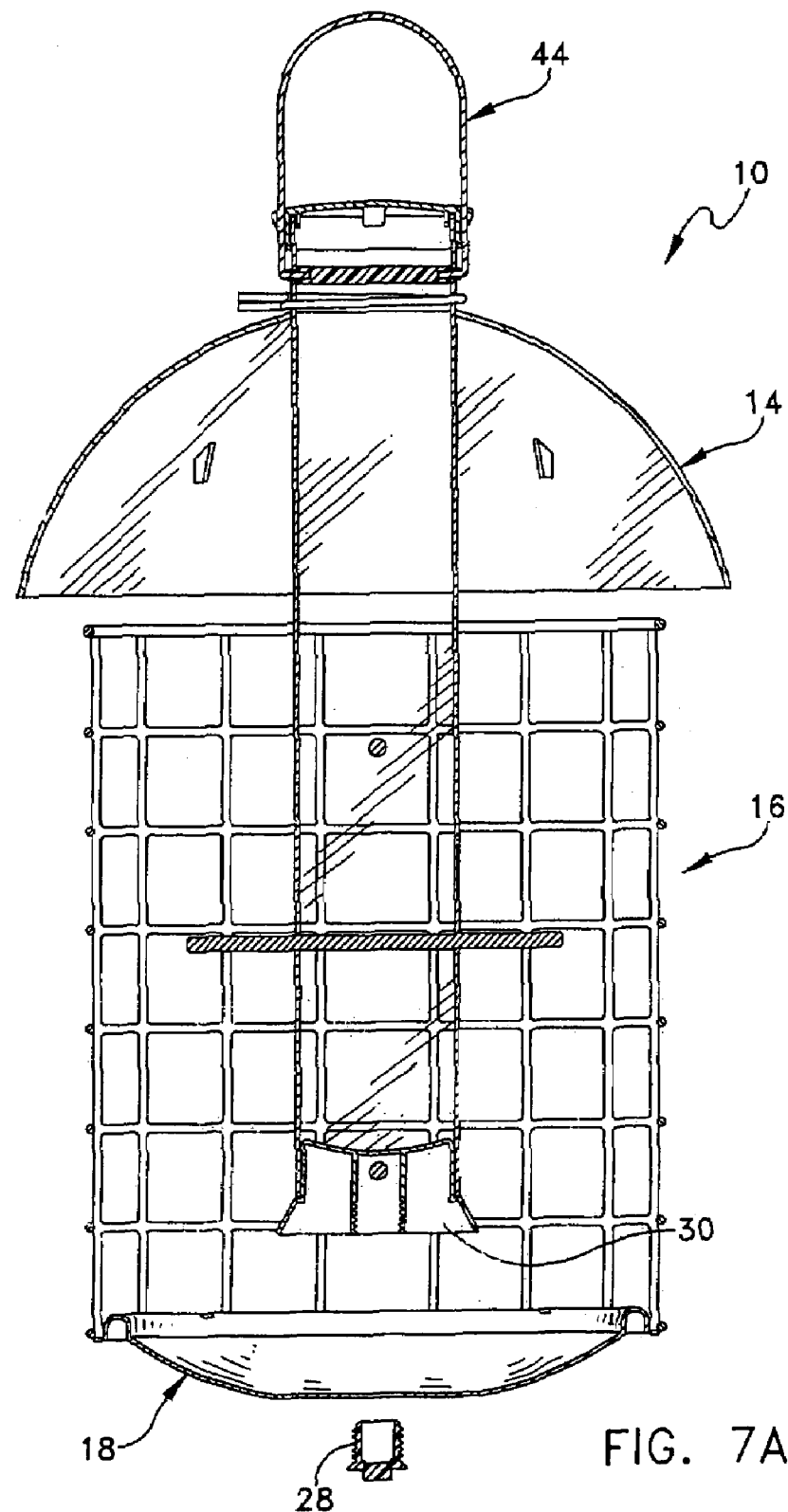
FIG. 7A is an expanded side view of the selective bird feeder of FIG. 1, showing how ht base, selective housing, and cover may be removed from the seed holder by removing the fastener from the base.

FIG. 7 is a schematic side view of selective bird feeder 10 in an assembled relation. In the present embodiment, seed holder 12 is supported on base 18 and attached thereto using fastener 28. In the present embodiment, fastener 28 is illustrated as a threaded plug, although those of skill in the art will recognize that other equivalent devices may be used. Also in the present embodiment, selective housing 16 is supported on base 18 and attached thereto by fasteners 65. Cover 14 is slidably received on seed housing 34 and supported on sidewall 36, where it is positioned by locator tabs 42. Seed holder 12 extends through aperture 62 of cover 14. Cap 40 is disposed over seed housing 34. Hanger 44 is attached to seed housing 24, as described above.

Figure 8:
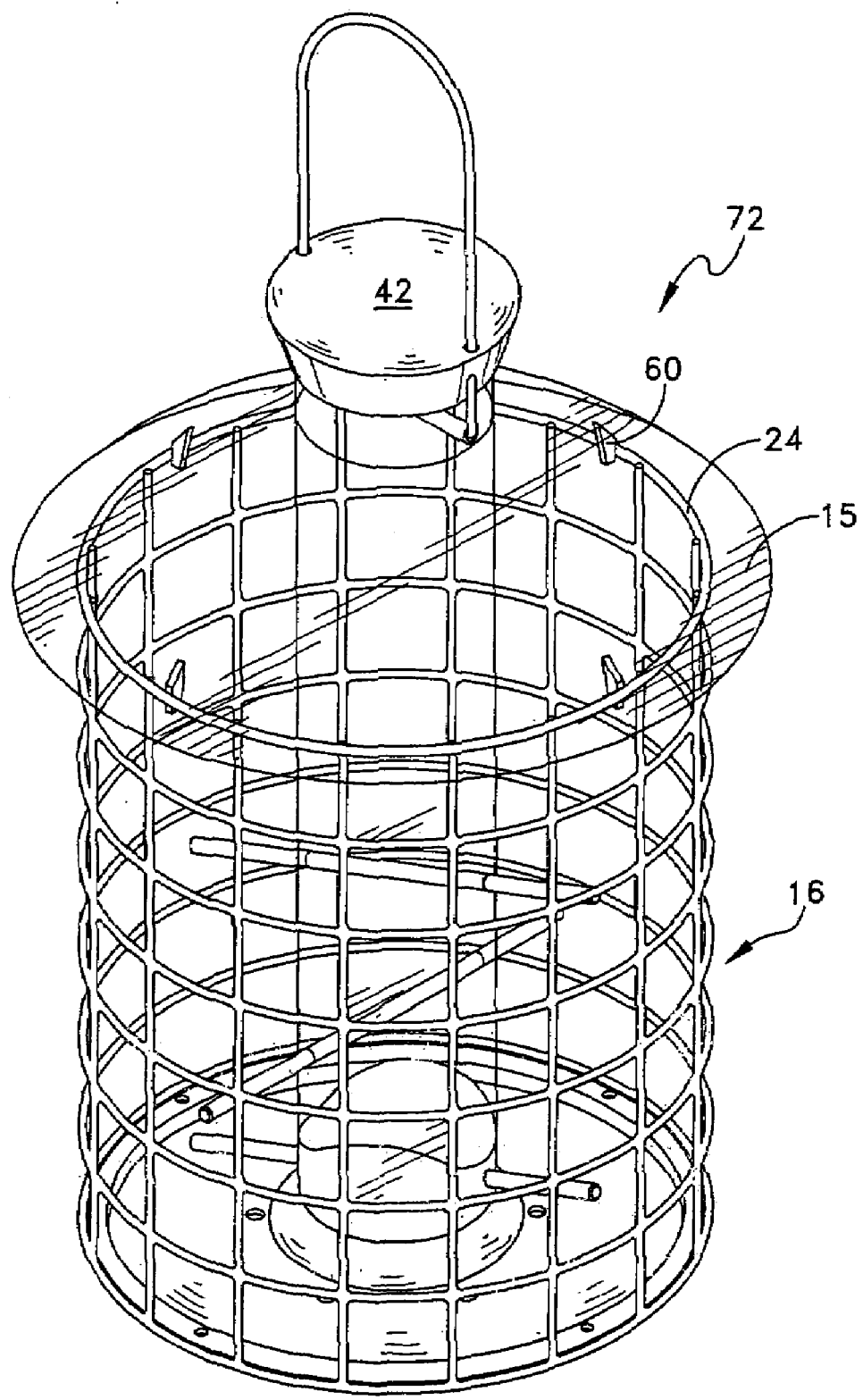
FIG. 8 is a perspective view of another embodiment of a selective bird feeder in assembled relation.

FIG. 8 illustrates another embodiment of a selective feeder 72 using cover 15 in place of cover 14.

Figure 9:
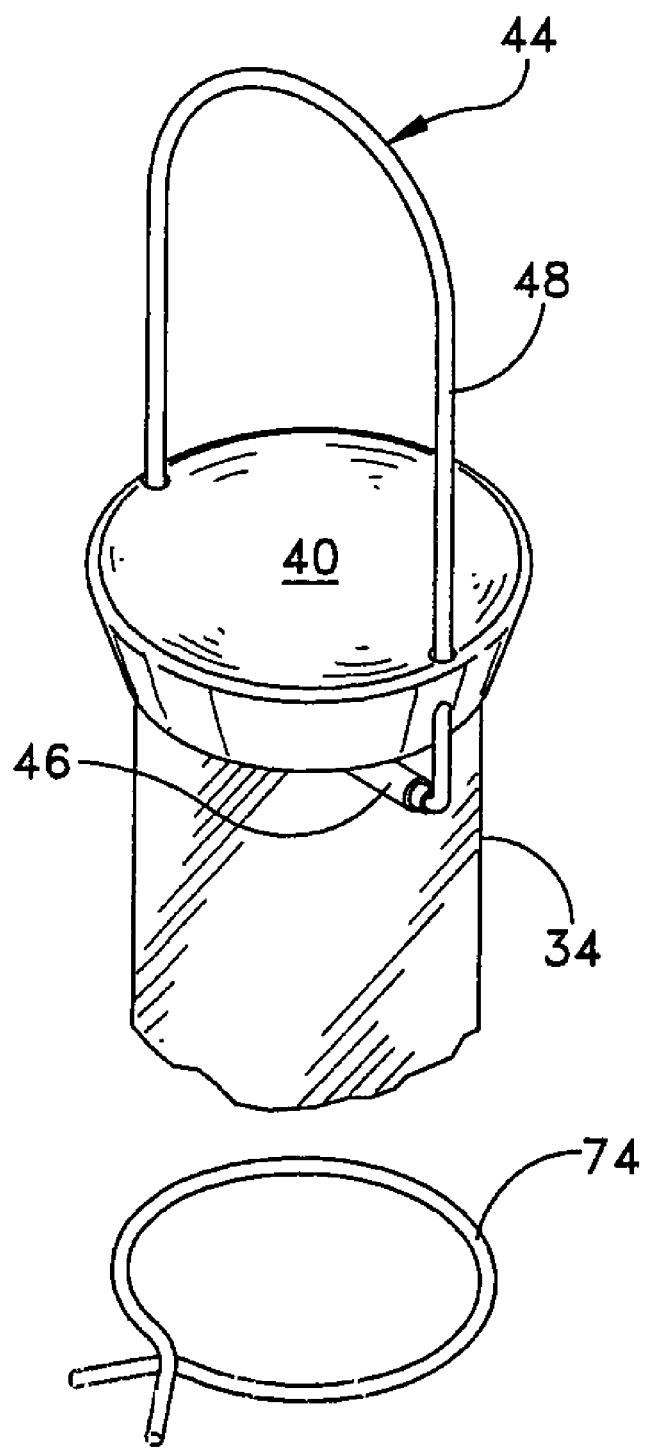
FIG. 9 is a perspective view of a device used to maintain a cover in fixed relation to the selective housing.
Figure 10:
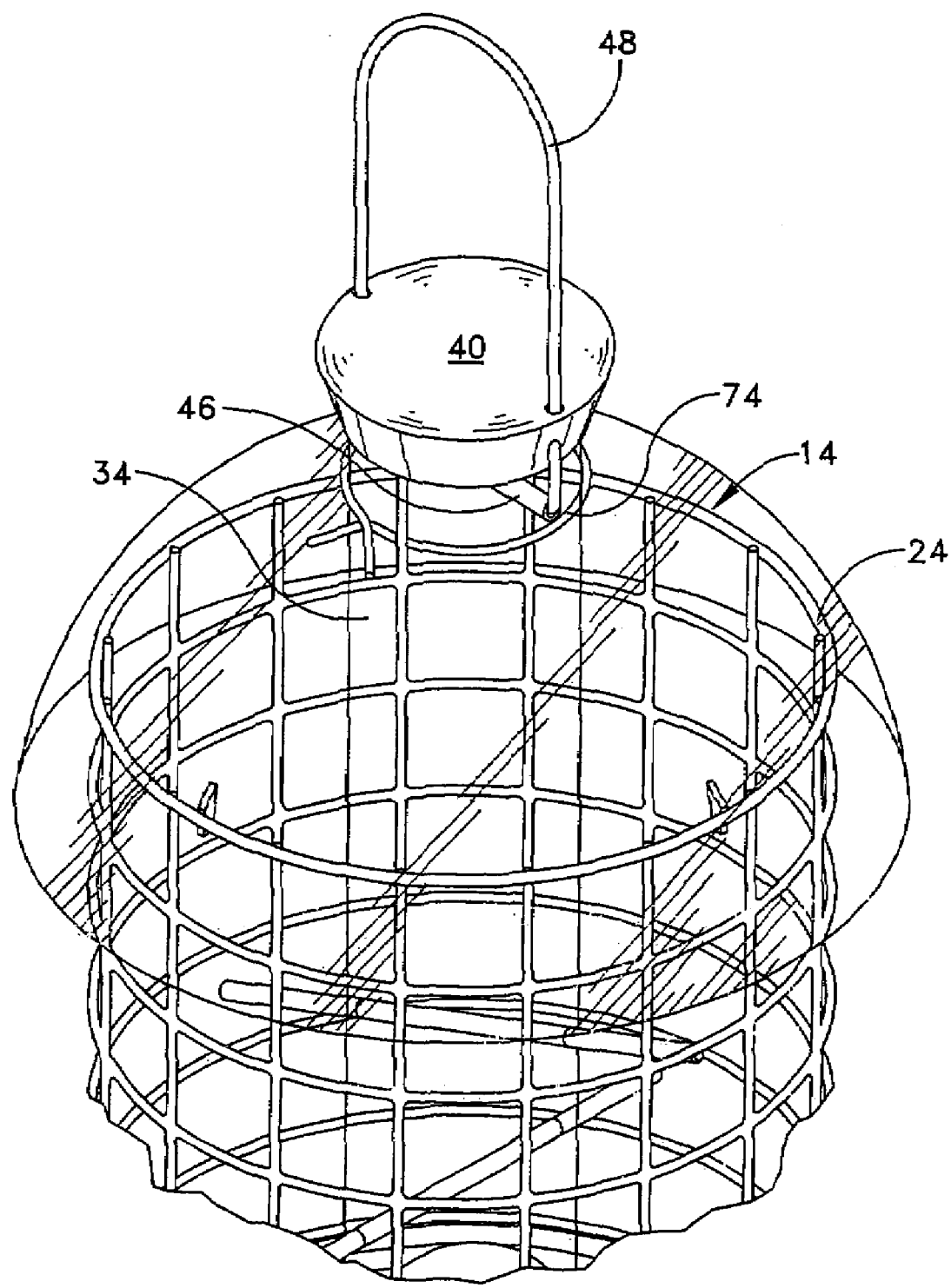
FIG. 10 is an expanded perspective view of a feeder including the device of FIG. 9, and showing the cover engaged with the selective housing and with the device positioned adjacent to and above the cover.
Figure 11:
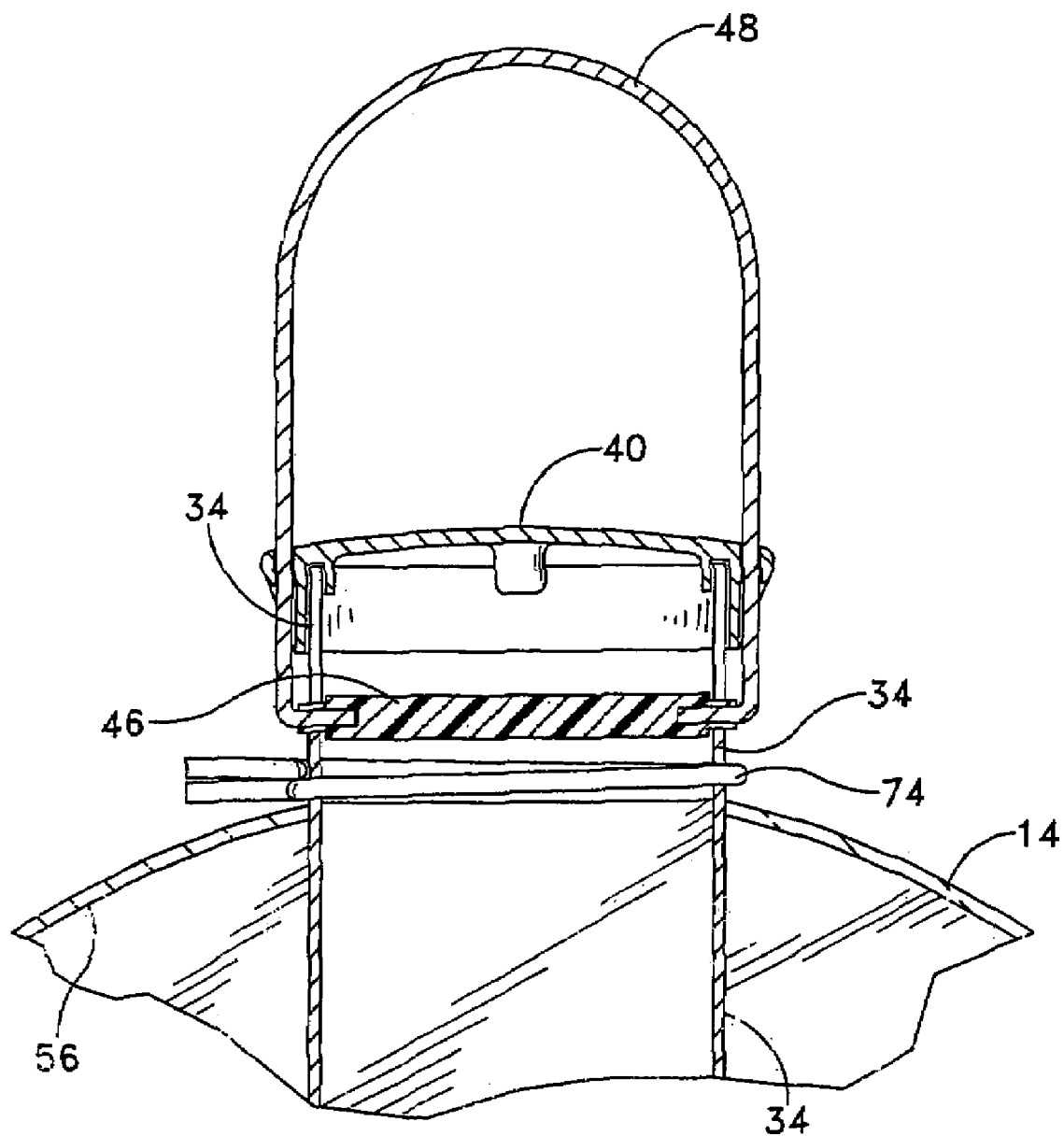
FIG. 11 is an expanded schematic side view of the feeder of FIG. 10.
Figure 12:
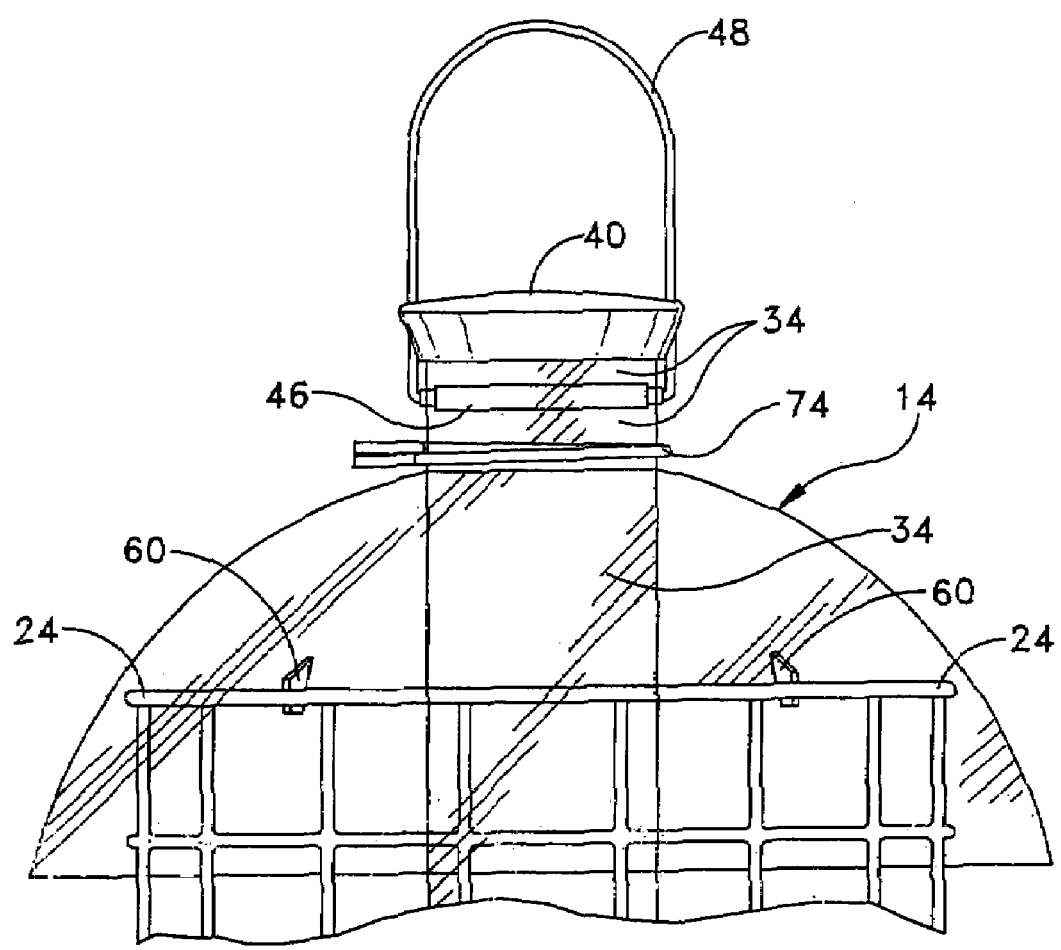
FIG. 12 is an expanded side view of the feeder of FIG. 10 showing the cap of the seed holder in a closed position and showing the cover in fixed relation to the selective housing with the locator tabs engaged with the selective housing.
Figure 13:
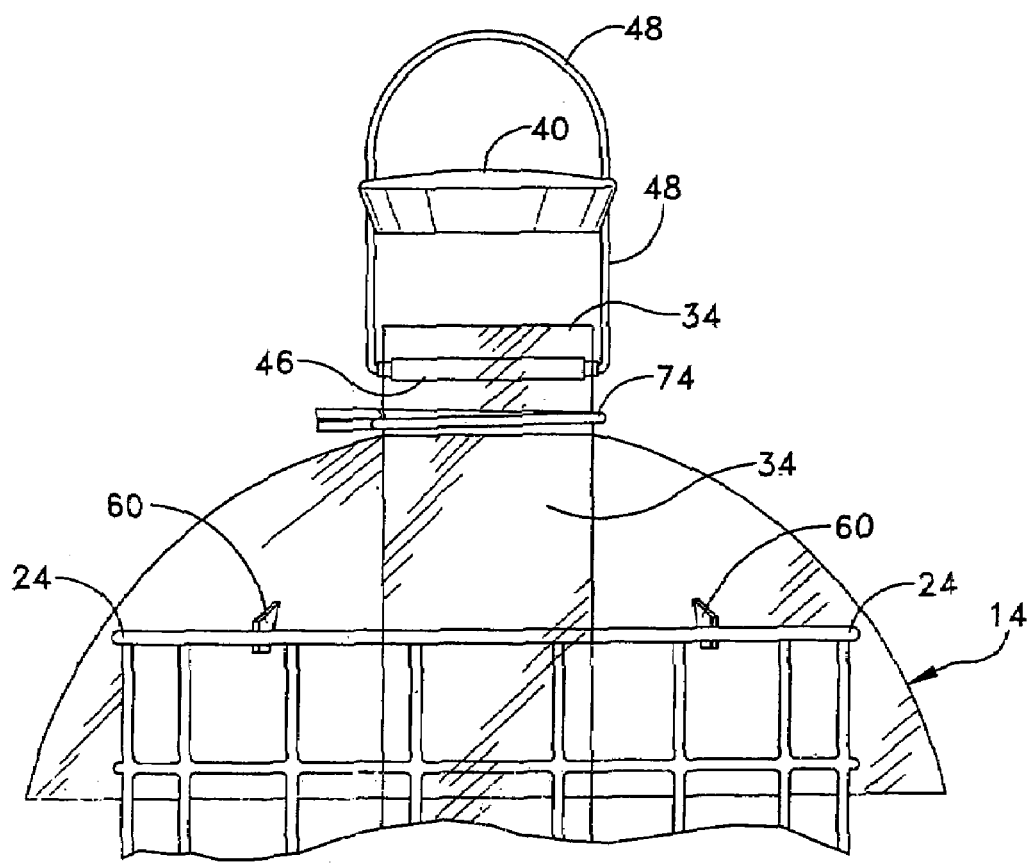
FIG. 13 is an expanded side view of the feeder of FIG. 10 showing the cap in an open position for adding seed to the seed holder, and showing the cover remaining in fixed relation to the selective housing.

FIG. 9 illustrates a device 74 that may be positioned on seed housing 34 above or below cover 14,15. Device 74 maintains cover 14,15 in substantially fixed relation to cap 40 and the upper edge 24 of side wall 22. When positioned above cover 14,15, device 74 prevents squirrels from lifting or removing the cover to access the birdseed contained within seed holder 12. Although illustrated herein as a spring clip, device 74 may be any device known to those of skill in the art that will accomplish the same result.

Figure 14:
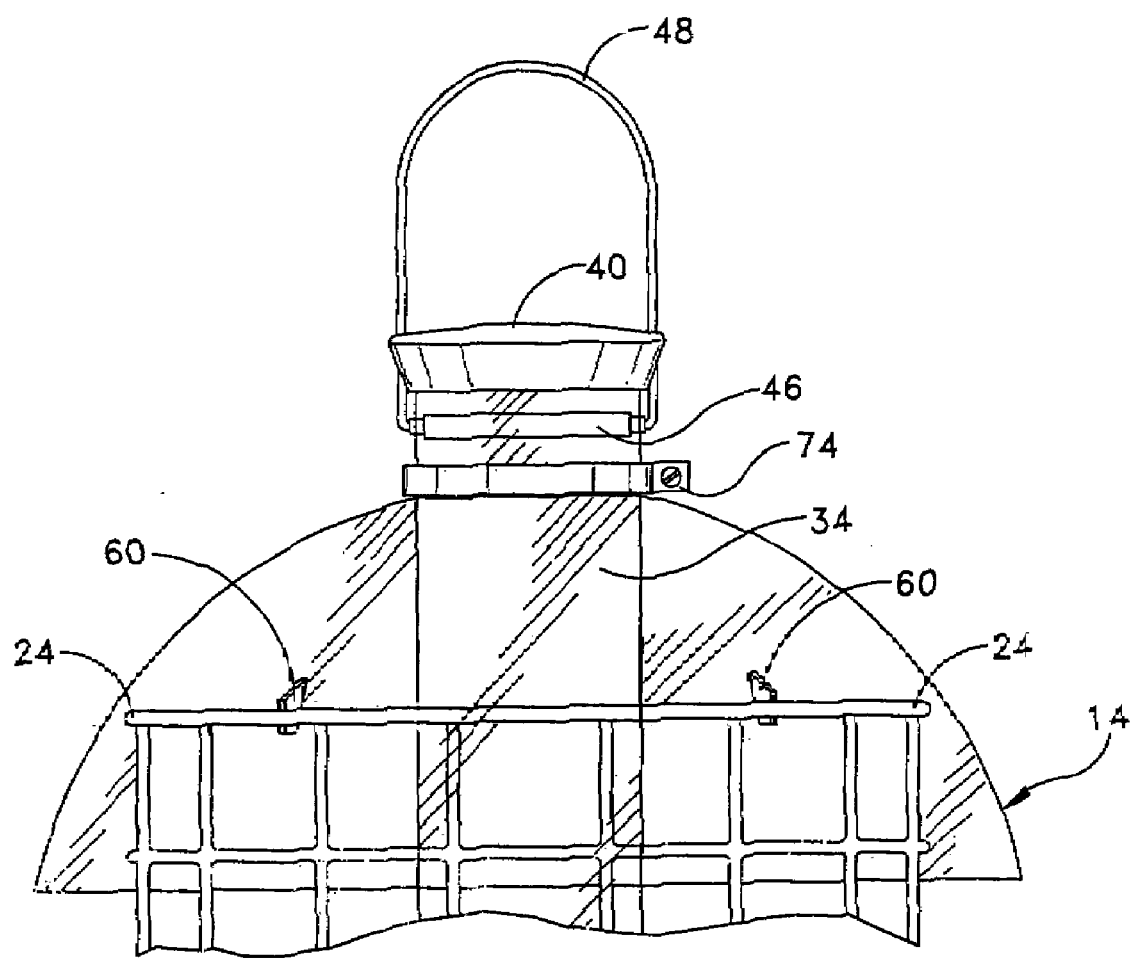
FIG. 14 is a schematic of an alternative device used to maintain the cover in fixed relation to the selective housing.

As shown in FIG. 14, device 74 may be a clamp that may be secured around seed housing 34 using a wing nut or the like. In another embodiment, device 74 may be an annular rib (not illustrated) integrally formed in seed housing 34, below which cover 14 may be positioned while supported on side wall 36 of selective housing 18. An annular rib positioned above cover 14,15 will function in the same manner as the spring clip or the clamp. In order to eliminate having to remove cover 14,15 when cleaning the selective housing 16 or base 28, a spring clip or clamp may be placed below cover 14,15 when used with annular rib.

Figure 15:
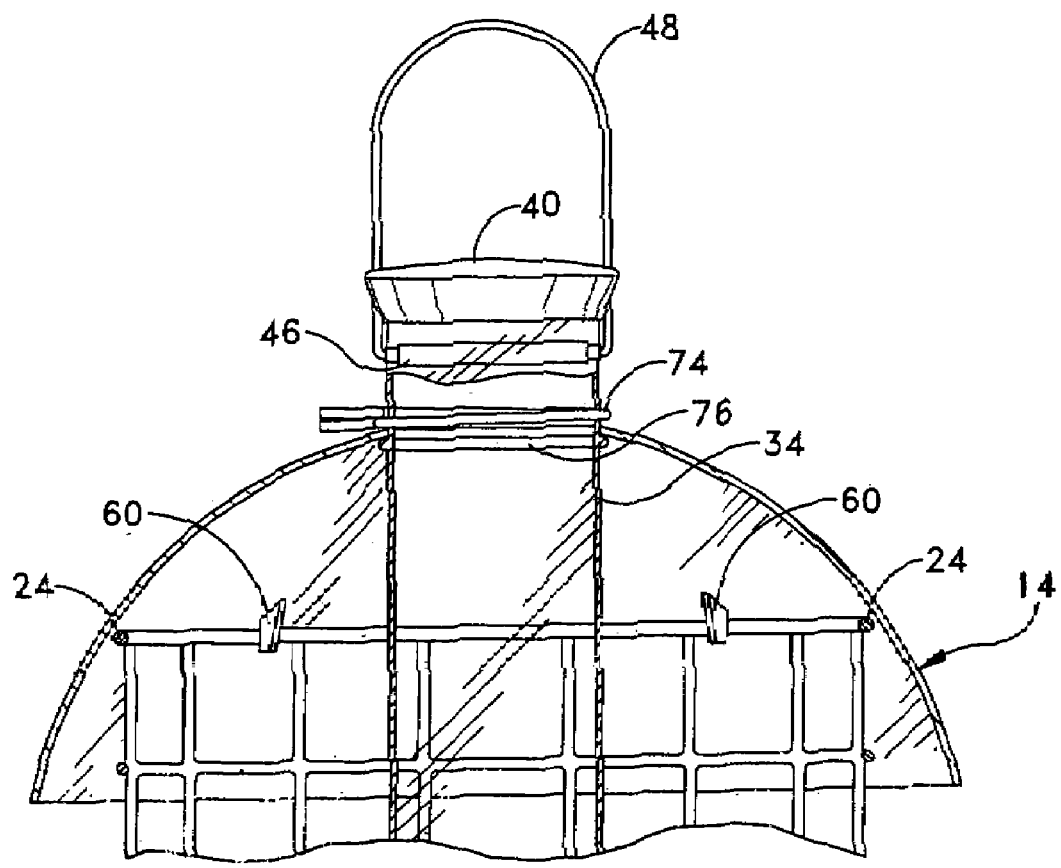
FIG. 15 is a schematic illustration of a seed holder cylinder having an annular rib on which a dome is supported, and including the device of FIG. 9 positioned above the cover.

In other embodiment shown in FIG. 15, an annular rib 76 may be disposed around seed housing 34 for supporting cover 14,15 in conjunction with device 74 positioned above cover 14,15.

It will be understood that various modifications may be made to the embodiments disclosed herein. The size and configuration of the bird feeder may be different, for example, although illustrated herein as cylindrical, the seed holder and selective housing may be, for example, square, oval, or any other shape and size. Although illustrated herein as a wire cage, the selective housing may be any material that allows the formation of apertures therein, for example, polycarbonate. Moreover, the size, shape, and quantity of the apertures in the selective housing may be greater or smaller, depending, for example, on the size of the selected animal. The cover of the selective housing may also have any shape or size. These and other changes can be made in the selective feeder provided the functioning and operation thereof are not adversely affected. Therefore, the above description should not be construed as limiting, but merely as exemplifications of a preferred embodiment. Those skilled in the art will envision other modifications within the scope spirit of the invention.

What is claimed is:

1. A selective bird feeder, comprising:
   a selective housing including a cylindrical sidewall having respective upper and lower peripheral edges, said cylindrical sidewall having means defining multiple apertures;
   a cylindrical seed holder contained coaxially within and spaced apart from the cylindrical sidewall of the selective housing;
   said seed holder including a base, a peripheral top edge and a cylindrical seed housing that together define a compartment for bird seed;
   the diameter of said selective housing being greater than the diameter of said seed holder housing so as to provide a sufficient space therebetween to allow the selected birds to enter and move freely therein;
   a feeder base having an apertured center area for supporting the seed holder base and a peripheral flange for supporting the lower peripheral edge of said selective housing cylindrical sidewall; wherein the lower peripheral edge of the selective housing cylindrical sidewall rest directly against the feeder base flange and the feeder base flange is a continuous annular convex flange that has the lower peripheral edge of the selective housing cylindrical sidewall secured at the flange by means of a plurality of spacedly disposed fasteners;
   a cover separate from and supported at least on the upper peripheral edge of the cylindrical sidewall of the selective housing; locator tabs on the interior surface of the cover to assist with positioning of the cover on the selective housing; wherein the only support between the upper edge of said selective housing and the cover is by virtue of the resting engagement therebetween;
   said cover including a lower peripheral edge and an upper edge defining a centrally disposed aperture for receiving therethrough the peripheral top edge of said seed holder seed housing when the cover is positioned on the cylindrical sidewall of the selective housing;
   the diameter of the lower peripheral edge of the cover being greater than the diameter of the cylindrical sidewall of the selective housing so that the lower peripheral edge of the cover extends beyond the cylindrical sidewall;
   the lower peripheral edge of the cover further disposed at a location below the top edge of the cylindrical sidewall when the cover is so disposed on the cylindrical sidewall;
   a seed holder cap engaging and closing the peripheral top edge of the cylindrical seed holder;
   a hanger attached to the seed holder and for also supporting the seed holder cap to enable the cap to be slid therealong to provide access to the seed holder housing;
   a clamp separate from said hanger disposed between said cover and seed holder cap to prevent removal of said cover;
   said clamp comprising an annular member that is secured about the seed holder cylindrical housing; and
   a fastening member constructed and arranged to removably secure the feeder base to the base of the seed holder;
   said fastening member comprising a threaded plug that is adapted to removably connect, through the centrally disposed aperture in said feeder base, to the base of said seed holder.

2. The selective bird feeder of claim 1, wherein the space between the selective housing and the seed holder is about 1.0 inches.

3. The selective bird feeder of claim 1, wherein the space between the selective housing and the seed holder is about 1.5 inches.

4. The selective bird feeder of claim 1, wherein the space between the selective housing and the seed holder is at least 2.0 inches.

5. The selective bird feeder of claim 1, wherein the cover is substantially dome-shaped, and the peripheral lower edge of the cover extends below the peripheral top edge of the selective housing by about the size of one of the multiple apertures in the cylindrical sidewall of the selective housing.

6. The selective bird feeder of claim 1 wherein said clamp comprises a spring clip.

7. The selective bird feeder of claim 1 wherein the base of said seed holder has an internally threaded female member adapted to threadedly engage with a male threaded plug.

8. The selective bird feeder of claim 1 wherein said cover, adjacent the lower peripheral edge thereof, rests upon the upper edge of said selective housing, whereby upon removal of said threaded plug said selective housing readily disengage with said cover to enable removal of the selective housing.

9. The selective bird feeder of claim 1 wherein the base of the seed holder is disposed in a flat plane and includes an upright middle collar that is internally threaded for engagement with the threaded plug.

10. The selective bird feeder of claim 9 wherein the apertured center area of the feeder base is constructed and arranged in a flat plane so as to receive the flat base of the seed holder.

11. The selective bird feeder of claim 1 including at least one perch supported by said cylindrical seed housing.

12. The selective bird feeder of claim 1 wherein the multiple apertures are each of a width ranging from about 1.3 inches to about 1.7 inches.

* * * * *